US010947407B2

(12) United States Patent
Shaffer et al.

(10) Patent No.: US 10,947,407 B2
(45) Date of Patent: Mar. 16, 2021

(54) COATING COMPOSITIONS

(71) Applicant: Essential Industries, Inc., Merton, WI (US)

(72) Inventors: Jay M. Shaffer, New Berlin, WI (US); Emily R. Dybdahl, Sussex, WI (US); Michael R. Underwood, Jr., Waukesha, WI (US)

(73) Assignee: Essential Industries, Inc., Merton, WI (US)

( * ) Notice: Subject to any disclaimer, the term of this patent is extended or adjusted under 35 U.S.C. 154(b) by 0 days.

(21) Appl. No.: 16/206,418

(22) Filed: Nov. 30, 2018

(65) Prior Publication Data

US 2019/0169459 A1 Jun. 6, 2019

Related U.S. Application Data

(60) Provisional application No. 62/593,439, filed on Dec. 1, 2017.

(51) Int. Cl.
| | |
|---|---|
| *C09D 133/06* | (2006.01) |
| *C09D 133/14* | (2006.01) |
| *C09D 7/61* | (2018.01) |
| *C09D 7/63* | (2018.01) |
| *C09D 175/04* | (2006.01) |
| *C09D 5/02* | (2006.01) |
| *C08G 18/08* | (2006.01) |
| *C09D 5/00* | (2006.01) |
| *C09D 7/40* | (2018.01) |
| *C08F 283/00* | (2006.01) |
| *C09D 143/04* | (2006.01) |
| *C08K 3/22* | (2006.01) |
| *C08K 5/098* | (2006.01) |
| *C08K 3/26* | (2006.01) |
| *C08K 3/36* | (2006.01) |
| *C08K 3/011* | (2018.01) |

(52) U.S. Cl.
CPC ........ *C09D 133/06* (2013.01); *C08F 283/006* (2013.01); *C08G 18/0866* (2013.01); *C09D 5/008* (2013.01); *C09D 5/024* (2013.01); *C09D 7/61* (2018.01); *C09D 7/63* (2018.01); *C09D 7/67* (2018.01); *C09D 133/14* (2013.01); *C09D 143/04* (2013.01); *C09D 175/04* (2013.01); *C08K 3/011* (2018.01); *C08K 3/22* (2013.01); *C08K 3/26* (2013.01); *C08K 3/36* (2013.01); *C08K 5/098* (2013.01); *C08K 2003/2227* (2013.01); *C08K 2003/2258* (2013.01); *C08K 2003/2296* (2013.01)

(58) Field of Classification Search
CPC ....... C08L 33/00–16; C09D 133/00–16; C08F 230/08
See application file for complete search history.

(56) References Cited

U.S. PATENT DOCUMENTS

| | | | |
|---|---|---|---|
| 5,244,696 A | 9/1993 | Hazan et al. | |
| 5,244,959 A | 9/1993 | Hazan et al. | |
| 5,250,605 A | 10/1993 | Hazan et al. | |
| 5,252,660 A | 10/1993 | Hazan et al. | |
| 5,280,054 A | 1/1994 | Sakai et al. | |
| 5,556,666 A | 9/1996 | Marciandi et al. | |
| 5,726,235 A | 3/1998 | Takagi et al. | |
| 6,727,309 B1 | 4/2004 | Paiva et al. | |
| 6,767,642 B2 | 7/2004 | Paquet, Jr. et al. | |
| 2004/0156994 A1 | 8/2004 | Wiese et al. | |
| 2004/0191498 A1 | 9/2004 | White et al. | |
| 2006/0217483 A1* | 9/2006 | Tennebroek | C09D 167/06 524/501 |
| 2006/0251882 A1 | 11/2006 | White et al. | |
| 2008/0181953 A1* | 7/2008 | Cassin | A61K 8/25 424/486 |
| 2013/0289233 A1 | 10/2013 | Droske | |
| 2014/0005313 A1* | 1/2014 | Bekiarian | C08K 9/06 524/188 |
| 2015/0018472 A1* | 1/2015 | Gaston | C09D 125/08 524/380 |

FOREIGN PATENT DOCUMENTS

| | | |
|---|---|---|
| CN | 102492085 A | 6/2012 |
| CN | 103409029 A | 11/2013 |
| JP | 59152972 A | 8/1984 |

(Continued)

OTHER PUBLICATIONS

Bauer et al., "Trialkoxysilane grafting onto nanoparticles for the preparation of clear coat polyacrylate systems with excellent scratch performance," Progress in Organic Coatings, 2003, 47, 147-153.
Grace Davison Engineered Materials, "Ludox Colloidal Silica in Coatings Lithium Polysilicate in Coatings," 2007.
Grace Materials Technologies, "Ludox, Colloidal Silica," 2012, 8 pages.
Hall et al., "Dissolution behavior of fluoroalcohol substituted polystyrenes," Proceedings of SPIE—The International Society for Optical Engineering, Aug. 2001, 4345, 7 pages.
Ludox—Technical Literature, 1999, 4 pages.

(Continued)

*Primary Examiner* — Marc S Zimmer
(74) *Attorney, Agent, or Firm* — Michael Best & Friedrich LLP

(57) ABSTRACT

A surface finish composition including a silica-bonded reversibly cross-linked co-polymer and a water-dispersible polyurethane. The silica-bonded reversibly cross-linked co-polymer includes a base co-polymer including monomers derived from one or more ethylenic polymerizable monomers and an alkoxysilyl acrylate; a reversible cross-linking agent; and a silica nanoparticle bonded to the base co-polymer. The amount of water-dispersible polyurethane is 15-50% by weight of the combined amount of water-dispersible polyurethane and base co-polymer.

20 Claims, No Drawings

(56) References Cited

FOREIGN PATENT DOCUMENTS

| | | | |
|---|---|---|---|
| JP | 61133277 | A | 6/1986 |
| JP | 3047669 | B2 | 7/1991 |
| JP | 4110302 | A | 4/1992 |
| JP | 10036617 | A | 2/1998 |
| JP | 10265580 | A | 10/1998 |
| JP | 11116885 | A | 4/1999 |
| JP | 4002320 | B2 | 10/2007 |
| JP | 2014177598 | A | 9/2014 |

OTHER PUBLICATIONS

Morales-Acosta et al., "Adjustable structural, optical and dielectric characteristics in sol-gel $SiO_2$ hybrid films," Journal of Non-Crystalline Solids, 2013, 362, 124-135.

Prospector, "Ludox AA," <https://www.ulprospector.com/en/na/Coatings/Detail/10912/702465/LUDOX-AM> webpage accessed Oct. 30, 2017.

Ribeiro et al., "Functional Films from Silica/Polymer Nanoparticles," Materials, 2014, 7, 3881-3900.

Sigma-Aldrich, "Product Specification, Product No. 420875," accessed Oct. 30, 2017, 1 page.

Sigma-Aldrich, Styrene and Functionalized Styrene <https://www.sigmaaldrich.com/materials-science/material-science-products.html?TablePage=16371135> webpage accessed Nov. 2, 2017.

Zhuravlev, "The surface chemistry of amorphous silica. Zhuravlev model," Colloids and Surfaces. A: Physicochemical and Engineering Aspecs, 2000, 173, 1-38.

\* cited by examiner

COATING COMPOSITIONS

CROSS-REFERENCE TO RELATED APPLICATION(S)

This application claims priority to U.S. Provisional Application No. 62/593,439, filed Dec. 1, 2017, which is hereby incorporated by reference in its entirety.

TECHNICAL FIELD

The present invention pertains to a wet emulsion coating composition for application to a substrate surface, such as a floor. More particularly, it relates to a strippable emulsion finish composition incorporating a silane-modified acrylic covalently bonded to a colloidal silica particle, formulated with a polyurethane dispersion, providing enhanced mar and scrub resistance without loss of gloss and stability.

BACKGROUND

Polymer compositions are used in the formulation of various coating compositions, such as floor finishes or polishes, for example. Commercially available floor finish compositions typically are aqueous emulsion-based polymer compositions including one or more organic solvents, plasticizers, coating aids, anti-foaming agents, polymer emulsions, metal complexing agents, waxes, and the like. The polymer composition is applied to a floor surface and then allowed to dry in air, normally at ambient temperature and humidity. A film is formed that serves as a protective barrier against soil deposited on the floor by pedestrian traffic, for example. These same polymer compositions can be applied to other substrate surfaces for which protection is desired, such as tile floors, walls, furniture, windows, counter tops, and bathroom surfaces, to name a few.

Although many of the commercially available aqueous floor finishes have performed well and have experienced some commercial success, opportunities for improvement remain. In particular, it is highly desirable that the resultant floor finish film exhibits certain physical and performance characteristics, including hardness, scratch resistance, soil resistance, black marks/scuff resistance, and abrasion resistance. For applications in which an enhanced floor finish mar resistance and scrub resistance is of great importance, currently available aqueous floor finish compositions may be less than satisfactory.

A primary factor in finish film mar and scuff resistance is the emulsion polymer formulation. A metal complexing agent included in the floor finish composition ionically bonds to the polymers when the composition is dried, resulting in the protective film. This reaction is reversible and the film is easily removed by a stripper solution when desired. In this regard, most aqueous floor finish polymer emulsions are poly-(styrene) acrylate based. Additives such as coalescing agents and plasticizers can only marginally improve the coating's hardness and resistance. Because resistance is a function of the types of solids within the formed film, a more viable approach may be to add hard, inorganic particles to the emulsion polymer matrix. In theory, these inorganic particles would increase the resistance to scratch, soil, mar, scuff, and scrub. While promising, simply adding these particles does not result in these improvements, as they do not remain evenly dispersed throughout the aqueous dispersion.

Until now, efforts have not achieved mar and scuff resistance, as well as scrub resistance, while maintaining a high gloss. Thus, a need existed for a surface finish composition exhibiting enhanced resistance properties, while maintaining high gloss.

SUMMARY

In one aspect, the invention provides a surface finish composition including a silica-bonded reversibly cross-linked co-polymer and a water-dispersible polyurethane. The silica-bonded reversibly cross-linked co-polymer includes a base co-polymer including monomers derived from one or more ethylenic polymerizable monomers and an alkoxysilyl acrylate of formula (I)

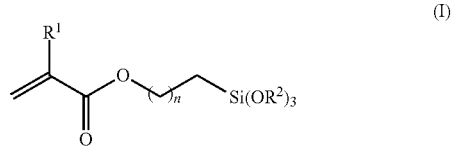

where $R^1$ is hydrogen or $C_{1-4}$alkyl, $R^2$ is $C_{1-4}$alkyl, and n is 1-3; a reversible cross-linking agent; and a silica nanoparticle bonded to the base co-polymer. The amount of water-dispersible polyurethane is 15-50% by weight of the combined amount of water-dispersible polyurethane and base co-polymer. The surface finish compositions of the invention provide a combination of strippability plus enhanced mar and scrub resistance without loss of gloss and stability.

In another aspect, the invention provides a surface finish composition prepared by combining a reversibly cross-linked co-polymer with a silica nanoparticle in a solvent, reacting the reversibly cross-linked co-polymer with the silica nanoparticle to form a covalent bond between a surface silanol group and the silicon atom derived from a monomer of formula (I) to provide a silica-bonded reversibly cross-linked co-polymer, and blending the silica-bonded reversibly cross-linked co-polymer with a water-dispersible polyurethane. The reversibly cross-linked co-polymer includes a reversible cross-linking agent and a base co-polymer including monomers derived from one or more ethylenic polymerizable monomers and the alkoxysilyl acrylate of formula (I) where $R^1$ is hydrogen or $C_{1-4}$alkyl, $R^2$ is $C_{1-4}$alkyl, and n is 1-3. The silica nanoparticle includes surface silanol groups. The amount of the water-dispersible polyurethane is 15-50% by weight of the total amount of water-dispersible polyurethane and base co-polymer.

In another aspect, the invention provides a method of preparing a surface finish composition including combining a reversibly cross-linked co-polymer with a silica nanoparticle in a solvent, reacting the reversibly cross-linked co-polymer with the silica nanoparticle to form a covalent bond between a surface silanol group and the silicon atom derived from a monomer of formula (I) to provide a silica-bonded reversibly cross-linked co-polymer, and blending the silica-bonded reversibly cross-linked co-polymer with a water-dispersible polyurethane. The reversibly cross-linked co-polymer includes a reversible cross-linking agent and a base co-polymer including monomers derived from one or more ethylenic polymerizable monomers and the alkoxysilyl acrylate of formula (I) where $R^1$ is hydrogen or $C_{1-4}$alkyl, $R^2$ is $C_{1-4}$alkyl, and n is 1-3. The silica nanoparticle includes surface silanol groups. The amount of the water-dispersible polyurethane is 15-50% by weight of the total amount of water-dispersible polyurethane and base co-polymer.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description. The invention is capable of other embodiments and of being practiced or of being carried out in various ways.

Surface Finish Compositions

Disclosed herein is a surface finish composition. The composition comprises a silica-bonded reversibly cross-linked co-polymer and a water-dispersible polyurethane.

In certain embodiments, the surface finish composition comprises a solids content of 50-80 weight % of the silica-bonded reversibly cross-linked co-polymer (i.e., the percent of total solids). The solids content may be from about 50 to about 80, about 50 to about 75, about 55 to about 75, about 60 to about 70, about 60 to about 65, or about 65 to about 70 weight % of the silica-bonded reversibly cross-linked co-polymer. The solids content may be about 50, 52, 54, 56, 58, 60, 61, 62, 63, 64, 65, 66, 67, 68, 69, 70, 72, 74, 76, 78, 80 weight % of the silica-bonded reversibly cross-linked co-polymer.

In certain embodiments, the surface finish composition comprises a solids content of 5-25 weight % of the water-dispersible polyurethane. The solids content may be from about 5 to about 25, about 10 to about 20, about 11 to about 19, about 12 to about 18, about 13 to about 17, or about 14 to about 16 by weight % of the water-dispersible polyurethane. The solids content may be about 5, 6, 7, 8, 9, 10, 11, 12, 13, 14, 15, 16, 17, 18, 19, 20, 21, 22, 23, 24, or 25 weight % of the water-dispersible polyurethane.

The amount of water-dispersible polyurethane represents 15% to 50% by weight of the combined amount of water-dispersible polyurethane and base co-polymer, based on solids. In certain embodiments, the amount of water-dispersible polyurethane is 15% to 20% by weight of the combined amount of water-dispersible polyurethane and base co-polymer. In certain embodiments, the amount of water-dispersible polyurethane is from about 15% to about 50%, about 15% to about 40%, about 15% to about 30%, or about 15% to about 20% by weight of the combined amount of water-dispersible polyurethane and base co-polymer. The amount of water-dispersible polyurethane may be about 15%, 16%, 17%, 18%, 19%, 20%, 21%, 22%, 23%, 24%, 25%, 26%, 27%, 28%, 29%, 30%, 32%, 34%, 36%, 38%, 40%, 42%, 44%, 46%, 48%, or 50% by weight of the combined amount of water-dispersible polyurethane and base co-polymer.

Optional solid additives (e.g., alkali-soluble resin, wax) in the surface finish composition may range from 10-30 weight % based on total solids. In some embodiments additional additives make up 15-25 weight % based on total solids.

In certain embodiments, the surface finish composition is an aqueous composition. Additionally, the aqueous composition may comprise 10-60% by weight of the base co-polymer. In other embodiments, the aqueous composition may comprise 30-50% by weight of the base co-polymer. The aqueous composition may comprise from about 10% to about 60%, about 20% to about 55%, about 30% to about 50%, about 35% to about 45%, about 30% to about 40%, or about 40% to about 50% by weight of the base co-polymer.

The aqueous composition may comprise about 10%, 15%, 20%, 25%, 30%, 32%, 34%, 35%, 36%, 37%, 38%, 39%, 40%, 41%, 42%, 43%, 44%, 45%, 46%, 48%, 50%, 55%, or 60% by weight of the base co-polymer.

In certain embodiments, the aqueous composition has a Tg at or below 25° C. The aqueous composition may have a Tg value from about 0 to about 25, about 5 to about 25, about 10 to about 25, about 15 to about 25, about 20 to about 25° C.

Silica-Bonded Reversibly Cross-Linked Co-Polymer

The silica-bonded reversibly cross-linked co-polymer comprises, or consists essentially of, a base co-polymer, a reversible cross-linking agent, and a silica nanoparticle bonded to the base co-polymer.

In certain embodiments, the silica-bonded reversibly cross-linked co-polymer contains a group of formula (II).

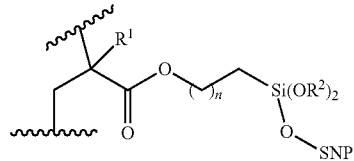

(II)

In formula (II), SNP is a silica nanoparticle moiety, $R^1$ is hydrogen or $C_{1-4}$alkyl, $R^2$ is $C_{1-4}$alkyl, and n is a number from 1 to 3. The term silica nanoparticle moiety refers to the portion of the silica nanoparticle bonded to the oxygen of a surface silanol, where said oxygen is covalently bonded to the base copolymer.

In certain embodiments, the surface finish composition comprises silica nanoparticles. The combined surface area of the silica nanoparticles may be from 8-32×10$^4$ m$^2$ per mole of monomer derived from the alkoxysilyl acrylate of formula (I). In other embodiments, the combined surface area of the silica nanoparticles may be from 16-18×10$^4$ m$^2$ per mole monomer derived from the alkoxysilyl acrylate of formula (I).

The combined surface area of the silica nanoparticles may be from about 10×10$^4$ to about 30×10$^4$, about 10×10$^4$ to about 25×10$^4$, about 11×10$^4$ to about 23×10$^4$, about 12×10$^4$ to about 22×10$^4$, about 13×10$^4$ to about 21×10$^4$, about 14×10$^4$ to about 20×10$^4$, about 15×10$^4$ to about 19×10$^4$, about 16×10$^4$ to about 18×10$^4$, about 15×10$^4$ to about 17×10$^4$, or about 17×10$^4$ to about 18×10$^4$ m$^2$ per mole monomer derived from the alkoxysilyl acrylate of formula (I).

Alternatively, the relative amount of silica nanoparticles to monomer derived from the alkoxysilyl acrylate of formula (I) may be based on the mole % of surface silanol groups per alkoxysilyl acrylate monomer. For example, in some embodiments the mole % of silanol groups on the silica nanoparticles relative to alkoxysilyl acrylate monomers may be from about 20-80%. In other embodiments, the mole % may be from about 10-70, 30-60, or 40-50%. In still other embodiments, the mole % may be about 20, 30, 40, 50, 60, 70, or 80%. In a preferred embodiment, the mole % is about 40%. The amount of silica nanoparticle solid used per mole of alkoxysilyl acrylate monomer may be calculated using the following formula, where the silica nanoparticles have a surface area of 211 m$^2$/g:

(6.02×10$^{23}$ molecules/1 mole alkoxysilyl acrylate monomer)×(1 nm$^2$/1.5 silanol molecules)×(1 m$^2$/1×10$^{18}$ nm$^2$)×(1 g silica/211 m$^2$)×mole % silanols=g silica nanoparticle solid For example, using silica particles with a surface area of 211 m²/g, one mole of alkoxysilyl acrylate monomer, and 40 mole % silanols, about 760.8 g of solid silica nanoparticles would be used. The total combined surface area of the silica nanoparticles per mole of alkoxysilyl acrylate monomer may be determined by multiplying the grams of silica nanoparticle by the surface area (m²/g) of the nanoparticles (e.g., 16×10⁴ m² in the above example).

In certain embodiments, the silica-bonded reversibly cross-linked co-polymer has a calculated glass transition temperature less than its decomposition temperature.

In some embodiments, the base co-polymer comprises a plurality of carboxylic acid groups and the reversible cross-linking agent reversibly crosslinks with a carboxylic acid of the base co-polymer. In certain embodiments, from 5-100% of the plurality of carboxylic acid groups of the base co-polymer are cross-linked. In certain other embodiments, from 40-60% of the plurality of carboxylic acid groups of the base co-polymer are cross-linked. In yet other embodiments, 50% of the plurality of carboxylic acid groups of the base co-polymer are cross-linked. The amount of the carboxylic acid groups of the base co-polymer that are cross-linked may be from about 5% to about 100%, about 5% to about 95%, about 10% to about 90%, about 15% to about 85%, about 20% to about 80%, about 25% to about 75%, about 30% to about 70%, about 35% to about 65%, about 40% to about 60%, about 45% to about 55%, about 40% to about 55%, about 40% to about 50%, about 45% to about 60%, or about 50% to about 60%. The amount of carboxylic acid groups of the base co-polymer that are cross-linked may be about 5%, 10%, 15%, 20%, 25%, 30%, 35%, 40%, 45%, 50%, 55%, 60%, 65%, 70%, 75%, 80%, 85%, 90%, 95%, or 100%.

The liquid compositions of the invention can be applied by any conventional method such as brushing, dipping, flow coating, roll coating, conventional and electrostatic spraying. Spray techniques are most often used. Typically, film thickness for liquid coatings can range between 0.1 and 5 mils, such as between 0.5 and 3 mils, or about 1.5 mils.

Base Co-Polymer

The base co-polymer comprises, or consists essentially of, monomers derived from one or more ethylenic polymerizable monomers and an alkoxysilyl acrylate of formula (I).

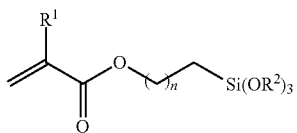

(I)

In formula (I), $R^1$ is hydrogen or $C_{1-4}$alkyl, $R^2$ is $C_{1-4}$alkyl, and n is a number from 1 to 3.

The one or more ethylenic polymerizable monomers may include one or more of optionally substituted styrenes (e.g., styrene, alpha-methyl styrene, vinyl toluene, and divinylbenzene), methacrylic and/or acrylic acid, one or more (meth)acrylate esters (e.g., butyl acrylate, ethyl acrylate, methyl acrylate, 2-ethyl hexyl acrylate, methyl methacrylate, ethyl methacrylate, butyl methacrylate), acrylonitrile, or acrylamides (e.g., acrylamide, methacrylamide).

In certain embodiments, the base co-polymer comprises 5-25 weight percent of carboxylic acid-containing monomer. In certain other embodiments, the base co-polymer comprises 12-17 weight percent of carboxylic acid-containing monomer. The base co-polymer may comprise from about 5 to about 25, about 6 to about 24, about 7 to about 23, about 8 to about 22, about 9 to about 21, about 10 to about 20, about 11 to about 19, about 12 to about 18, about 13 to about 17, or about 14 to about 16 weight percent of carboxylic acid-containing monomer. The base co-polymer may comprise about 5, 6, 7, 8, 9, 10, 11, 12, 13, 14, 15, 16, 17, 18, 19, 20, 21, 22, 23, 24, 25 weight percent of carboxylic acid-containing monomer.

In certain embodiments, the base co-polymer is derived from monomers of styrene, methacrylic acid, one or more $C_{1-4}$alkyl (meth)acrylates, and alkoxysilyl acrylate of formula (I). In certain other embodiments, the base co-polymer is derived from monomers comprising styrene, methacrylic acid, one or more $C_{1-4}$alkyl (meth)acrylates, or a combination thereof. In certain other embodiments, the base co-polymer is derived from monomers consisting essentially of, styrene, methacrylic acid, one or more $C_{1-4}$alkyl (meth)acrylates, or a combination thereof. In yet other embodiments, the base co-polymer is derived from components selected from the group consisting of monomers of styrene, methacrylic acid, one or more $C_{1-4}$alkyl (meth)acrylates, alkoxysilyl acrylate of formula (I), and combinations thereof.

In certain embodiments, 1-10 weight percent of the base co-polymer is derived from the alkoxysilyl acrylate of formula (I). The base co-polymer may be derived from components including the alkoxysilyl acrylate of formula (I) in an amount from about 1 to about 8, about 2 to about 6, about 3 to about 5, about 1 to about 4, about 2 to about 4, about 3 to about 4, about 4 to about 5, about 4 to about 6, about 4 to about 7, or about 4 to about 8 weight percent. The base co-polymer may be derived from components including the alkoxysilyl acrylate of formula (I) in an amount of about 1, 1.5, 2, 2.2, 2.4, 2.6, 2.8, 3, 3.2, 3.4, 3.6, 3.8, 4, 4.2, 4.4, 4.6, 4.8, 5, 5.2, 5.4, 5.6, 5.8, 6, 6.5, 7, 7.5, 8, 8.5, 9, 9.5, or 10 weight percent.

More particularly, the base co-polymer may be derived from one part styrene, 0.5-0.7 parts methacrylic acid, 2-3 parts of the one or more $C_{1-4}$alkyl (meth)acrylates, and 0.1-0.2 parts of the alkoxysilyl acrylate of formula (I).

Reversible Cross-Linking Agent

In certain embodiments, the reversible cross-linking agent is a metal cross-linking agent, preferably a compound of zinc, aluminum, tungsten, zirconium, an alkaline earth metal, or combinations or alloys thereof. Additionally, the metal cross-linking agent may be an oxide, hydroxide, carbonate, acetate, or combinations thereof.

Silica Nanoparticle

The silica nanoparticle may be a plurality of silicon nanoparticles. The plurality of silicon nanoparticles may have a distribution of particle sizes represented by an average particle size. In certain embodiments, the silica nanoparticle has an average particle size of 5 to 50 nm. In other embodiments, the silica nanoparticle has an average particle size of 7 to 20 nm. In yet other embodiments, the silica nanoparticle has an average particle size of 12 nm. The silica nanoparticle may have an average particle size of about 5 to about 50, about 7 to about 20, or about 10 to about 15 nm. The silica nanoparticle may have an average particle size of about 5, 6, 7, 8, 9, 10, 11, 12, 13, 14, 15, 16, 17, 18, 19, 20, 25, 30, 35, 40, 45, or 50 nm.

The silica nanoparticle is a colloidal silica, typically used as an aqueous dispersion (e.g., 30% silica dispersion). Preferably the silica is a monodisperse grade, such as LUDOX® AM30. In certain embodiments, the silica nanoparticle has surface modifications. For example, the surface may be modified with a small amount of an aluminate compound so the charge density is maintained and the stability range is extended from about pH 4-10.5. In some embodiments, the silica is an anionic grade silica nanoparticle (e.g., with a sodium counterion). In certain embodiments, the silica nanoparticle is stable over pH 4-9.

Water-Dispersible Polyurethane

In certain embodiments, the water-dispersible polyurethane is a dispersion, such as an aqueous dispersion, for example. The dispersion may have a Tg value at or below 25° C. The dispersion may have a Tg value from about 0 to about 25, about 5 to about 25, about 10 to about 25, about 15 to about 25, or about 20 to about 25° C.

Other Components

In certain embodiments, the surface finish composition further comprises one or more solvent, surfactant, initiator, neutralizer, biocide, preservative, defoamer, alkali-soluble resin, water-dispersible wax emulsion, coalescing solvent, leveler, plasticizer, and/or ammonia.

The alkali-soluble resins include copolymers of styrene or vinyl toluene with at least one α-β-monoethylenically unsaturated acid or anhydride such as styrene-maleic anhydride resins, rosin/maleic anhydride adducts which are condensed with polyols, and the like. The alkali-soluble resins typically have a weight average molecular weight from about 500 to 10,000 and preferably from about 1000 to 5000. The resins are often used as a conventional resin cut, which is an aqueous solution of the resin with an alkaline substance having a fugitive cation such as ammonium hydroxide. The alkali soluble resin is typically employed in amounts from 0 to about 20 weight percent and preferably in amounts from 0 to about 15 weight percent based on the weight of the finish composition.

The waxes or mixtures of waxes that can be used include waxes of a vegetable, animal, synthetic, and/or mineral origin. Representative waxes include, for example, carnuba, candelilla, lanolin, stearin, beeswax, oxidized polyethylene wax, polyethylene emulsions, polypropylene, copolymers of ethylene and acrylic esters, hydrogenated coconut oil or soybean oil, and the mineral waxes such as paraffin or ceresin. The waxes typically range from 0 to about 15 weight percent and preferably from about 2 to about 10 weight percent based on the weight of the finish composition.

The surface composition may contain from about 1 to about 10 weight percent plasticizer based on the weight of the finish composition. The plasticizer facilitates film formation at ambient temperatures when the coating is applied to a substrate. A fugitive or semi-fugitive plasticizer is preferred over a permanent plasticizer for many applications. A fugitive or semi-fugitive plasticizer is a plasticizer that at least partially evaporates as the coating dries. Permanent plasticizers do not evaporate. Mixtures of fugitive and permanent plasticizers can be used. The particular plasticizer and the amount used are chosen in accordance with the demand for compatibility with the formulation, efficiency in lowering the film-forming temperature, and clarity of the coating.

Fugitive plasticizers or coalescents include, for example, the monobutyl, monoethyl, monomethyl or other monoalkyl ethers of diethylene glycol or diproplyleneglycol, isophorone, benzyl alcohol, butyl cellosolve, and 3-methoxybutanol-1. Permanent plasticizers include, for example, benzyl butyl phthalate, dibutyl phthalate, dimethyl phthalate, triphenyl phosphate, 2-ethyl hexyl benzylphthalate, fatty oil acid esters of caprolactam, acetyl tributyl citrate, toluene ethyl sulfonamide, tributoxyethyl phosphate, and tributyl phosphate Method of Preparation Disclosed herein is a method of preparing a surface finish composition. The method comprises combining a reversibly cross-linked co-polymer with a silica nanoparticle in a solvent, reacting the reversibly cross-linked co-polymer with the silica nanoparticle to form a covalent bond between a surface silanol group and the silicon atom derived from a monomer of formula (I) to provide a silica-bonded reversibly cross-linked co-polymer, and blending the silica-bonded reversibly cross-linked co-polymer with a water-dispersible polyurethane.

In certain embodiments, the reversibly cross-linked co-polymer and silica nanoparticle are heated above ambient temperature for a sufficient time to form the covalent bond.

In certain embodiments, the reversibly cross-linked co-polymer and silica nanoparticle are heated above ambient temperature for 1-5 hours. The reversibly cross-linked co-polymer and silica nanoparticle may be heated above ambient temperature for about 0.1 to about 10, about 1 to about 5, about 2 to about 4, about 2 to about 3, about 3, to about 4, about 1 to about 4, about 1 to about 3, about 1 to about 2, about 2 to about 5, about 3 to about 5, or about 4 to about 5 hours. The reversibly cross-linked co-polymer and silica nanoparticle may be heated above ambient temperature for at least about 0.1, about 0.5, about 1, about 1.5, about 2, about 2.5, about 3, about 3.5, about 4, about 4.5, or about 5 hours. The reversibly cross-linked co-polymer and silica nanoparticle are heated above ambient temperature for less than about 10, about 8, about 6, about 5, about 4.5, about 4, about 3.5, about 3, about 2.5, about 2, about 1.5, or about 1 hours. The reversibly cross-linked co-polymer and silica nanoparticle are heated above ambient temperature for about 0.1, 0.5, 1, 1.25, 1.5, 1.75, 2, 2.25, 2.5, 2.75, 3, 3.25, 3.5, 3.75, 4, 4.25, 4.5, 4.75, 5, 5.5, 6, 7, 8, 9, or 10 hours.

In certain embodiments, the reversibly cross-linked co-polymer and silica nanoparticle are heated to 140-150° F. The reversibly cross-linked co-polymer and silica nanoparticle may be heated from about 100 to about 200, about 110 to about 180, about 120 to about 170, about 130 to about 160, about 140 to about 150, about 145 to about 150, or about 140 to about 145° F. The reversibly cross-linked co-polymer and silica nanoparticle may be heated to greater than or equal to about 100, about 110, about 120, about 130, about 135, about 140, about 141, about 142, about 143, about 144, about 145, about 146, about 147, about 148, about 149, about 150, about 155, about 160, about 170, about 180, about 190, or about 200° F. The reversibly cross-linked co-polymer and silica nanoparticle may be heated to less than or equal to about 100, about 110, about 120, about 130, about 135, about 140, about 141, about 142, about 143, about 144, about 145, about 146, about 147, about 148, about 149, about 150, about 155, about 160, about 170, about 180, about 190, or about 200° F. The reversibly cross-linked co-polymer and silica nanoparticle may be heated to about 100, 110, 120, 125, 130, 132, 134, 136, 138, 140, 141, 142, 143, 144, 145, 146, 147, 148, 149, 150, 152, 154, 156, 158, 160, 165, 170, 180, 190, or 200° F.

EXAMPLES

It should be kept in mind that the following described embodiments are only presented by way of example and should not be construed as limiting the inventive concept to any particular physical configuration.

Mar and Scuff Resistance Test

Black VCT tiles were coated with 2 coats of the finish formula, with 1 hour dry times after each coat. The coating then cured for 24 hours and was placed in a Snell capsule containing 4 leather cubes, and rotated at about 28 rotations per minutes for 2 hours.

The tiles were then visually rated from 1-5, with a rating of 1 having 0-5% surface scuffing, a rating of 2 having 6-20% surface scuffing, a rating of 3 having 21-50% surface scuffing, a rating of 4 having 51-75% surface scuffing, and a rating of 5 having 76-100% surface scuffing.

Gloss Readings

Gloss was measured using an Elcometer gloss meter at 20 degrees and 60 degrees.

Scrub Resistance Test

Black VCT tiles were coated with 2 coats of the finish formula, with 1 hour dry times after each coat. The coating then cured for 24 hours at 25° C. The tile was cut in half, and each half placed in a Gardco Washability and Wear Tester. A square of an auto-scrubber red pad was placed on the scrubber and about 3-5 mL of a ready-to-use neutral-pH cleaner was applied across the length of the tile along the path of the scrubber. The scrubber ran for 200 cycles, and then the tile was rinsed with water and allowed to dry.

The tiles were then visually rated from 1-5, with a rating of 1 having 1-5% of the coating removed or discolored, a rating of 2 having 6-20% of the coating removed or discolored, a rating of 3 having 21-50% of the coating removed or discolored, a rating of 4 having 51-75% of the coating removed or discolored, and a rating of 5 having 76-100% of the coating removed or discolored.

Removability

Black VCT tiles were coated with 2 coats of the finish formula, with 1 hour dry times after each coat. The coating then cured for 24 hours at 25° C. The tiles were cut in half, and each half placed in a Gardco Washability and Wear Tester. A square of an auto-scrubber red pad was placed on the scrubber and about 3-5 mL of a ready to use floor coating stripper was applied across the length of the tile along the path of the scrubber. The scrubber ran for 50 cycles, and then the tile was rinsed with water and allowed to dry.

The tiles were then visually rated from 1-5, with a rating of 1 having 90-100% of the coating removed, a rating of 2 having 75-89% of the coating removed, a rating of 3 having 50-75% of the coating removed, a rating of 4 having 25-49% of the coating removed, and a rating of 5 having 0-24% of the coating removed.

Oven Stability 1 oz. of the formulated product was sealed in a glass vial and set in a 50° C. oven for 30 days. The sample was removed after 30 days and the formula was observed to see if it was still homogeneous or if it had separated into a water phase and a solid or thickened phase, or if it thickened. If it remained homogenous and did not thicken after 30 days, then it was considered to pass oven stability.

Procedures/Formulations:

Polymer Composition Including Silane-Functional Monomer

A polymer was formulated using the components listed in Table 1.

TABLE 1

| Material Type | Material | Amount (g) |
| --- | --- | --- |
| Solvent | Water | 490.1 |
| Surfactant Anionic | (Kraft Chemical) Surfactonal 125-E (50-60% solids) | 13 |
| Nonionic | (Dow Chemical) Tergitol 15 S 3 (100% solids) | 5 |
| Monomer | Butyl acrylate | 155 |
|  | Styrene | 77 |
|  | (Evonik) Dynasylan SIVO 250 (MW 248) | 13.3 |
|  | Methacrylic acid (MW 86.06) | 49 |
|  | Methyl methacrylate | 40 |
| Initiator | t-Butyl Hydroperoxide | 0.6 |
|  | Ammonium Persulfate | 1 |
| Metal cross-linker | Zinc Oxide (MW 81.38) | 11 |
| Total |  | 855.0 g |

The polymer was prepared as follows. A 1000-mL rounded bottom Pyrex reactor was charged with water and the surfactants, and mixed with a 3-in. diameter stainless steel impeller blade. A separate monomer feed was set up where all the monomers were mixed together in a 600-mL beaker and 20% of the total mixture was removed and placed in a separate 150-mL beaker. Ammonium persulfate (APS) was premixed with water no more than 30 minutes before being added to the reactor. The reactor was heated to 140° F. and then the 20% monomer mix "seed" was added, immediately followed by the APS premix. The reactor was heated to 170° F. and the monomer feed was started. Monomer was pumped into the reactor over 90 minutes at 170-180° F., then held for 60 minutes from 170-180° F. Zinc oxide powder was premixed into a slurry with water and added to the reactor and held for 30 minutes from 170-180° F.

Colloidal Silica-Particle Bonded onto Silane-Functional Polymer

The silane-functional polymer formulation above (Table 1) was then mixed with 134.5 grams of a 30% by weight colloidal silica dispersion, Ludox® AM (Grace). In one batch, the colloidal silica was added at room temperature and mixed for 4.5 hours. In another batch, the colloidal silica was blended in with the silane-functional polymer at 140-150° F., held at this temperature for 4.5 hours, and cooled to below at least 100° F.

Then for both batches, 9.5 grams of a neutralizer, ammonium hydroxide (26 Deg), and 1 gram of a preservative/biocide, Proxel GXL, were added. The batches were separately filtered through a 260 micron paint strainer.

Colloidal Silica Amount

The percentage of colloidal silica used in relation to the silane monomer was tested. A ladder study was done using 20%, 40%, 60%, and 80% silica based on molar equivalence of silanol groups with silane monomer (Table 2). These formulas were tested using the mar and scuff resistance test described herein.

TABLE 2

| % Silica | Silica surface area (m²) per mole silane monomer | Initial 20° Gloss | Final 20° Gloss | 20° Gloss Loss | Initial 60° Gloss | Final 60° Gloss | 60° Gloss Loss |
|---|---|---|---|---|---|---|---|
| 20 | $8 \times 10^4$ | 30.6 | 27.8 | 2.8 | 65.9 | 63.6 | 2.3 |
| 40 | $16 \times 10^4$ | 26.0 | 26.0 | 0.0 | 61.9 | 61.6 | 0.3 |
| 60 | $24 \times 10^4$ | 31.4 | 30.0 | 1.4 | 67.5 | 64.7 | 2.8 |
| 80 | $32 \times 10^4$ | 28.7 | 26.8 | 1.9 | 64.7 | 62.1 | 2.6 |

In the tested system, 40% silica gave the lowest gloss difference after the mar and scuff resistance test.

Comparative Tests

Three floor finish compositions (Formulas 1-3) were tested for comparison with compositions (Formula 4-6) according to the present disclosure (Table 3).

Formulas 1 and 2 were typical floor finish compositions. Formula 1 included metal-cross-linked (styrenated) acrylic polymer, alkali-soluble resin, polyethylene or polypropylene wax emulsion, coalescing agents (glycol ethers, propylene glycol ethers), plasticizers, leveling agents, a defoamer, and a biocide. Formula 2 included colloidal silica post-added to the formula.

Formula 3 was an aqueous film-forming, reversibly cross-linked, polymer composition and a surface modified inorganic polymer as described in U.S. Pat. No. 6,727,309.

Formulas 4-6 included the silane-functional, reversibly cross-linked polymer modified with a colloidal silica particle formulated into a typical floor finish composition. In particular, Formula 4 included silanated polymer and silica without heat; formula 5 included silanated polymer and silica with heat; and formula 6 included silanated polymer, silica with heat, and a polymeric plasticizer (PUD).

TABLE 3

| Formula | 20° Gloss | 60° Gloss | Scrub Resistance | Scuff Resistance | Removability |
|---|---|---|---|---|---|
| 1 | 19.7 | 56.4 | 1 | 4 | 1 |
| 2 | 21.1 | 56.6 | 1 | 4 | 2 |
| 3 | 18.5 | 51.5 | 3 | 1 | 3 |
| 4 | 32.9 | 67.7 | 1 | 3 | 2 |
| 5 | 26.0 | 61.9 | 3 | 1 | 2 |
| 6 | 27.9 | 65.2 | 1 | 1 | 1 |

Scrub Resistance and PUD

To promote adhesion and flexibility, a waterborne polyurethane dispersion that had a Tg at or below 25° C. was blended into the formula at a range of percentages from 0-50% based on polymer solids. At 18.75% PUD blended with 81.25% acrylic (the base co-polymer) greatly improved scrub resistance of the film (Table 4).

TABLE 4

| % Polyurethane to Acrylic based on solids | Scrub Resistance |
|---|---|
| 0 | 5 |
| 6.25 | 5 |
| 12.5 | 5 |
| 18.75 | 1 |
| 25 | 2 |
| 31.25 | 2 |
| 37.5 | 1 |
| 43.75 | 2 |
| 50 | 2 |

Other Preparations

Formulated polymers were made according to Table 5. Polymer was first added to a 100 mL beaker with magnetic stir bar stirring at a rate to create a small vortex in the mixture. Next an alkali-soluble resin was added, then a defoamer. Next a blend of coalescing solvent and water was added slowly. A polyethylene emulsion wax was added, then a leveler, and finally ammonia was added to adjust the pH to 7.5-8.5.

TABLE 5

| Material | Amount (g) |
|---|---|
| Silica-bonded reversibly crosslinked copolymer (39-40% solids) | 423.5 |
| PUD w/Tg at or below 25° C. (42% solids) | 90.0 |
| 23% solids solution of an alkali-soluble resin | 15.2 |
| Defoamer (Tego Foamex 825) | 0.4 |
| Water | 268.846 |
| Biocide/Preservative (Troy Corp. Mergal 14) | 0.25 |
| Biocide/Preservative (Cupric Nitrate) | 0.004 |
| Dipropylene glycol monomethyl ether | 57.0 |
| 35% solids polyethylene wax emulsion | 140.1 |
| Fluorosurfactant leveler (DuPont Capstone FS-65) | 2.0 |

The polymer outlined in Table 5 was also created using silane-functional monomers Evonik VPS ACMO and Evonik VPS MEEO, as a one-to-one substitute with Evonik Dynasylan SIVO 250. Evonik Dynasylan SIVO 250 is 3-trimethoxysilylpropyl methacrylate. Evonik VPS ACMO is (3-acryloxypropyl) trimethoxysilane. Evonik VPS MEEO is 3-(triethoxysilyl)propyl methacrylate.

The polymer with Evonik VPS MEEO resulted in poor filtration and grit, so was not blended with colloidal silica and formulated. The Evonik VPS ACMO sample processed fine and was formulated and tested alongside the Evonik Dynasylan SIVO 250 samples. The results are shown in Table 6.

TABLE 6

| Silane functional monomer | Colloidal silica | Silica particle size (nm) | Rating (1-5 with 5 completely covered in scuffs) |
|---|---|---|---|
| SIVO 250 | Ludox AM | 12 | 1 |
| | Ludox TMA | 22 | 4 |
| | Ludox AS-30 | 12 | 5 |
| | Ludox AS-40 | 22 | 3 |
| ACMO | Ludox AM | 12 | 1 |
| | Ludox TMA | 22 | 5 |
| | Ludox AS-30 | 12 | 5 |
| | Ludox AS-40 | 22 | 5 |

Ludox AM reacted with the silane-functional monomer greatly increased scuff resistance.

Definitions

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The terms "comprise(s)", "include(s)", "having", "has", "can", "contain(s)", and variants thereof, as used herein, are intended to be open-ended transitional phrases, terms, or words that do not preclude the possibility of additional acts or structures. The singular forms "a", "and", and "the" include plural references unless the context clearly dictates otherwise. The present disclosure also contemplates other embodiments "comprising", "consisting of", and "consisting essentially of", the embodiments or elements presented herein, whether explicitly set forth or not.

The modifier "about" used in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4". The term "about" may refer to plus or minus 10% of the indicated number. For example, "about 10%" may indicate a range of 9% to 11%, and "about 1%" may mean from 0.9-1.1.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

The term "alkoxy," as used herein, refers to an alkyl group, as defined herein, appended to the parent molecular moiety through an oxygen atom. Representative examples of alkoxy include, but are not limited to, methoxy, ethoxy, propoxy, 2-propoxy, butoxy and tert-butoxy.

The term "alkyl," as used herein, means a straight or branched, saturated hydrocarbon chain. The term $C_{1-4}$alkyl means a straight or branched chain hydrocarbon containing from 1 to 4 carbon atoms. Representative examples of alkyl include, but are not limited to, methyl, ethyl, n-propyl, iso-propyl, n-butyl, sec-butyl, iso-butyl, tert-butyl, n-pentyl, isopentyl, neopentyl, n-hexyl, 3-methylhexyl, 2,2-dimethylpentyl, 2,3-dimethylpentyl, 4,4-dimethylpentan-2-yl, n-heptyl, n-octyl, n-nonyl, and n-decyl.

It is understood that the foregoing detailed description and accompanying examples are merely illustrative and are not to be taken as limitations upon the scope of the invention, which is defined solely by the appended claims and their equivalents.

What is claimed is:

1. A surface finish composition comprising:
   a) a silica-bonded reversibly cross-linked co-polymer comprising
      i) a base co-polymer comprising monomers derived from one or more ethylenic polymerizable monomers and an alkoxysilyl acrylate of formula (I)

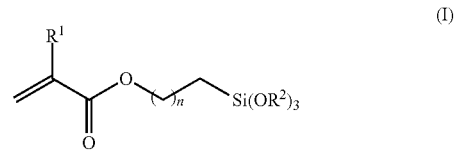

wherein $R^1$ is hydrogen or $C_{1-4}$alkyl, $R^2$ is $C_{1-4}$alkyl, and n is 1-3;
      ii) a reversible cross-linking agent; and
      iii) a plurality of silica nanoparticles bonded to the base co-polymer, wherein the silica nanoparticles have surface silanol groups in an amount of about 40 mole % relative to the monomers derived from the alkoxysilyl of formula (I); and
   b) a water-dispersible polyurethane;
   wherein the amount of water-dispersible polyurethane is 15-50% by weight of the combined amount of water-dispersible polyurethane and base co-polymer.

2. The surface finish composition of claim 1, wherein the one or more ethylenic polymerizable monomers comprises one or more of optionally substituted styrenes, methacrylic and/or acrylic acid, and one or more (meth)acrylate esters.

3. The surface finish composition of claim 1, wherein the reversible cross-linking agent is a metal cross-linking agent.

4. The surface finish composition of claim 3, wherein the metal cross-linking agent is a compound of zinc, aluminum, tungsten, zirconium, or an alkaline earth metal.

5. The surface finish composition of claim 1, wherein the base co-polymer comprises a plurality of carboxylic acid groups and the reversible cross-linking agent reversibly crosslinks with a carboxylic acid of the base co-polymer.

6. The surface finish composition of claim 1, wherein the silica nanoparticle has an average particle size of 5 to 50 nm.

7. The surface finish composition of claim 1 wherein the silica-bonded reversibly cross-linked co-polymer contains a group of formula (II):

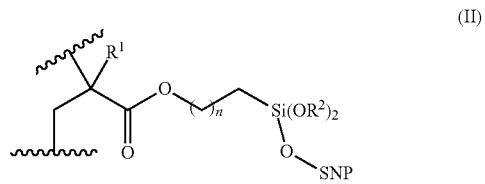

wherein SNP is a silica nanoparticle moiety.

8. The surface finish composition of claim 1, wherein the base co-polymer is derived from monomers of styrene, methacrylic acid, one or more $C_{1-4}$alkyl (meth)acrylates, and the alkoxysilyl acrylate of formula (I), wherein $R^1$ is hydrogen or methyl, $R^2$ is methyl, and n is 2.

9. The surface finish composition of claim 1, wherein about 2 to about 4 weight percent of the base co-polymer is derived from the alkoxysilyl acrylate of formula (I).

10. The surface finish composition of claim 1, wherein the combined surface area of the silica nanoparticles is about $16 \times 10^4$ $m^2$ per mole of monomer derived from the alkoxysilyl acrylate of formula (I).

11. The surface finish composition of claim 1 comprising a solids content of
   50-80 weight % of the silica-bonded reversibly cross-linked co-polymer; and
   5-25 weight % of the water-dispersible polyurethane.

12. The surface finish composition of claim 1, wherein the composition is an aqueous composition.

13. The surface finish composition of claim 12, wherein the aqueous composition comprises 10-60% by weight of the base co-polymer.

14. A surface finish composition prepared by
combining a reversibly cross-linked co-polymer with silica nanoparticles in a solvent, wherein the reversibly cross-linked co-polymer comprises a reversible cross-linking agent and a base co-polymer comprising monomers derived from one or more ethylenic polymerizable monomers and an alkoxysilyl acrylate of formula (I)

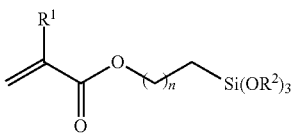

(I)

wherein $R^1$ is hydrogen or $C_{1-4}$alkyl, $R^2$ is $C_{1-4}$alkyl, and n is 1-3; and the silica nanoparticles comprise, surface silanol groups in au amount of about 40 mole % relative to the monomers derived from the alkoxysilyl acrylate of formula (I);

reacting the reversibly cross-linked co-polymer with the silica nanoparticles to form a covalent bond between a surface silanol group and the silicon atom derived from a monomer of formula (I) to provide a silica-bonded reversibly cross-linked co-polymer; and blending the silica-bonded reversibly cross-linked co-polymer with a water-dispersible polyurethane, wherein the amount of the water-dispersible polyurethane is 15-50% by weight of the total amount of water-dispersible polyurethane and base co-polymer.

15. A method of preparing a surface finish composition comprising combining a reversibly cross-linked co-polymer with a silica nanoparticle in a solvent, wherein the reversibly cross-linked co-polymer comprises a reversible cross-linking agent and a base co-polymer comprising monomers derived from one or more ethylenic polymerizable monomers and an alkoxysilyl acrylate of formula (I)

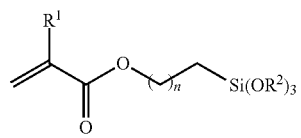

(I)

wherein $R^1$ is hydrogen or $C_{1-4}$alkyl, $R^2$ is $C_{1-4}$alkyl, and n is 1-3; and the silica nanoparticles comprises surface silanol groups in an amount of about 40 mole % relative to the monomers derive from the alkoxysilyl acrylate of formula (I);

reacting the reversibly cross-linked co-polymer with the silica nanoparticles to form a covalent bond between a surface silanol group and the silicon atom derived from a monomer of formula (I) to provide a silica-bonded reversibly cross-linked co-polymer; and blending the silica-bonded reversibly cross-linked co-polymer with a water-dispersible polyurethane, wherein the amount of the water-dispersible polyurethane is 15-50% by weight of the total amount of water-dispersible polyurethane and base co-polymer.

16. The surface finish composition of claim 9, wherein about 4 weight percent of the base co-polymer is derived from the alkoxysilyl acrylate of formula (I).

17. The surface finish composition of claim 12, wherein the silica nanoparticle has an average particle size of about 10 to about 15 nm.

18. The surface finish composition of claim 17, wherein the silica nanoparticle has an average particle size of about 12 nm.

19. The surface finish composition of claim 17, wherein the silica nanoparticles are surface-modified with an aluminate compound and stable over a pH range of about 4-10.5.

20. The surface finish composition of claim 18, wherein the silica nanoparticles are surface-modified with an aluminate compound and stable over a pH range of about 4-10.5.

* * * * *